(12) United States Patent
Zhong et al.

(10) Patent No.: US 12,062,060 B2
(45) Date of Patent: Aug. 13, 2024

(54) METHOD AND DEVICE FOR PROCESSING USER INTERACTION INFORMATION

(71) Applicant: Beijing Wodong Tianjun Information Technology Co., Ltd., Beijing (CN)

(72) Inventors: Yu Zhong, Beijing (CN); Ruihuan Du, Beijing (CN); Bo Cui, Beijing (CN); Ruyang Shou, Beijing (CN); Zhangang Lin, Beijing (CN); Xi Chen, Beijing (CN); Harikesh Sasikumar Nair, Beijing (CN)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 309 days.

(21) Appl. No.: 17/604,283

(22) PCT Filed: Mar. 26, 2020

(86) PCT No.: PCT/CN2020/081317
§ 371 (c)(1),
(2) Date: Oct. 15, 2021

(87) PCT Pub. No.: WO2020/211616
PCT Pub. Date: Oct. 22, 2020

(65) Prior Publication Data
US 2022/0198487 A1    Jun. 23, 2022

(30) Foreign Application Priority Data
Apr. 15, 2019   (CN) .......................... 201910300614.4

(51) Int. Cl.
*G06Q 30/0202*   (2023.01)
*G06N 7/01*   (2023.01)
*G06Q 30/0201*   (2023.01)

(52) U.S. Cl.
CPC .......... *G06Q 30/0202* (2013.01); *G06N 7/01* (2023.01); *G06Q 30/0201* (2013.01)

(58) Field of Classification Search
CPC ........... G06Q 10/00–50/00; G06N 3/00–20/00
(Continued)

(56) References Cited

U.S. PATENT DOCUMENTS 8,301,506 B2 * 10/2012 Tan .................... G06Q 30/0601
                                                           705/26.1
10,089,675 B1 * 10/2018 Rastogi ............... G06Q 10/067
(Continued)

FOREIGN PATENT DOCUMENTS

CN   101206752 A    6/2008
CN   101329674 A   12/2008
(Continued)

OTHER PUBLICATIONS

International Search Report for PCT/CN2020/081317, dated May 18, 2020, 5 pgs.

*Primary Examiner* — Alan S Miller
(74) *Attorney, Agent, or Firm* — Blank Rome LLP

(57) ABSTRACT

Embodiments of the present disclosure disclose a method and a device for processing user interaction information. A specific embodiment of the method comprises: acquiring a set of user interaction information associated with a preset interaction operation, wherein the user interaction information comprises category information and brand information of an interaction object, user attribute information, and operation time information of interaction operations corresponding to a brand of the interaction object; generating a corresponding interaction feature of a user on the basis of the set of user interaction information; and determining, on the basis of the interaction feature of the user and a pre-trained preset operation probability generation model, a probability of the user executing a target operation associated with a
(Continued)

brand of the interaction object in the corresponding user interaction information.

20 Claims, 5 Drawing Sheets

(58) Field of Classification Search
USPC ................................................ 705/7.11–7.42
See application file for complete search history.

(56) References Cited

U.S. PATENT DOCUMENTS

| | | | | |
|---|---|---|---|---|
| 10,157,351 | B1* | 12/2018 | Rastogi | G06F 16/957 |
| 11,301,761 | B2* | 4/2022 | Krishnamurthy | G06Q 30/00 |
| 2006/0277103 | A1* | 12/2006 | Fujita | G06Q 30/0268 |
| | | | | 705/14.67 |
| 2008/0065471 | A1* | 3/2008 | Reynolds | G06Q 30/0201 |
| | | | | 705/7.32 |
| 2008/0270363 | A1* | 10/2008 | Hunt | G06F 16/2462 |
| 2009/0006156 | A1* | 1/2009 | Hunt | G06Q 30/02 |
| | | | | 705/7.11 |
| 2009/0063283 | A1* | 3/2009 | Kusumoto | G06Q 30/02 |
| | | | | 705/14.25 |
| 2010/0268661 | A1* | 10/2010 | Levy | G06Q 30/02 |
| | | | | 705/347 |
| 2013/0197968 | A1* | 8/2013 | Davis | G06Q 30/0201 |
| | | | | 705/7.29 |
| 2018/0232774 | A1* | 8/2018 | Ng | G06Q 30/0269 |
| 2019/0138917 | A1* | 5/2019 | Krishnamurthy | G06Q 30/00 |
| 2019/0205736 | A1* | 7/2019 | Bleiweiss | G06F 9/3887 |
| 2019/0205905 | A1* | 7/2019 | Raghunathan | G06F 18/214 |
| 2019/0213598 | A1* | 7/2019 | Levy | G06Q 30/0631 |

FOREIGN PATENT DOCUMENTS

| | | |
|---|---|---|
| CN | 101408964 A | 4/2009 |
| CN | 102426686 A | 4/2012 |
| CN | 102479366 A | 5/2012 |
| CN | 104809626 A | 7/2015 |
| CN | 104820879 A | 8/2015 |
| CN | 105447724 A | 3/2016 |
| CN | 105678578 A | 6/2016 |
| CN | 106327227 A | 1/2017 |
| CN | 106779074 A | 5/2017 |
| CN | 106779985 A | 5/2017 |
| CN | 107105031 A | 8/2017 |
| CN | 107944913 A | 4/2018 |
| CN | 108053295 A | 5/2018 |
| CN | 108153791 A | 6/2018 |
| CN | 108711075 A | 10/2018 |
| CN | 109190808 A | 1/2019 |
| CN | 109272373 A | 1/2019 |
| CN | 109460513 A | 3/2019 |
| CN | 109492687 A | 3/2019 |
| CN | 109495552 A | 3/2019 |
| CN | 109509054 A | 3/2019 |
| CN | 109509056 A | 3/2019 |

* cited by examiner

METHOD AND DEVICE FOR PROCESSING USER INTERACTION INFORMATION

The present application is a national stage of International Application No. PCT/CN2020/081317, filed on Mar. 26, 2020, which claims the priority of Chinese Patent Application No. 201910300614.4, titled "METHOD AND DEVICE FOR PROCESSING USER INTERACTION INFORMATION", filed on Apr. 15, 2019. Both of the aforementioned applications are hereby incorporated by reference in their entireties.

TECHNICAL FIELD

Embodiments of the present disclosure relate to the technical fields of computers, and specifically to a method and apparatus for processing user interaction information.

BACKGROUND

With the development of artificial intelligence technology, machine learning models have been widely used in the field of e-commerce. A typical application is to apply a prediction model to predict user preferences based on the history of the user interactions with objects (e.g., browsing commodity information, purchasing commodities), thereby predicting the probabilities of the user performing the related operations.

SUMMARY

Embodiments of the present disclosure provide a method and apparatus for processing user interaction information.

In a first aspect, some embodiments of the present disclosure provide a method for processing user interaction information, and the method includes: acquiring a set of user interaction information associated with a preset interaction operation, where the user interaction information includes: category information and brand information of an interaction object, user attribute information, and operation time information of an interaction operation corresponding to a brand of the interaction object; generating, based on the set of user interaction information, a corresponding user interaction feature; and determining, based on the user interaction feature and a pre-trained preset operation probability generation model, a probability of a user performing a target operation associated with a brand of an interaction object in corresponding user interaction information.

In a second aspect, some embodiments of the present disclosure provide an apparatus for processing user interaction information, and the apparatus includes: an acquisition unit, configured to acquire a set of user interaction information associated with a preset interaction operation, where the user interaction information includes: category information and brand information of an interaction object, user attribute information, and operation time information of an interaction operation corresponding to a brand of the interaction object; a first generation unit, configured to generate generate, based on the set of user interaction information, a corresponding user interaction feature; and a determination unit, configured to determine, based on the user interaction feature and a pre-trained preset operation probability generation model, a probability of a user performing a target operation associated with a brand of an interaction object in corresponding user interaction information.

In a third aspect, some embodiments of the present disclosure provide a computer-readable medium storing a computer program thereon, where the program, when executed by a processor, implements the method as described in any of the implementations of the first aspect.

BRIEF DESCRIPTION OF THE DRAWINGS

By reading the detailed description of non-limiting embodiments with reference to the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
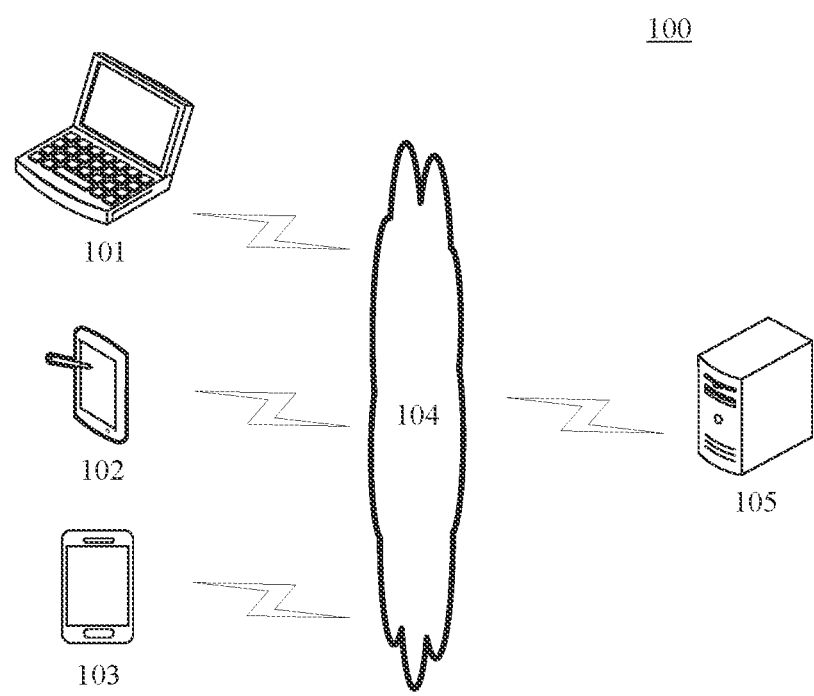
FIG. 1 is an example system architecture to which an embodiment of the present disclosure may be applied.

FIG. 1 shows an example architecture 100 to which a method or apparatus for processing user interaction information of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

The terminal devices 101, 102, 103 interact with the server 105 through the network 104 to receive or send messages. Various communication client applications, such as web browser applications, shopping applications, search applications, instant messaging tools, email clients, social platform software, may be installed on the terminal devices 101, 102, 103.

The terminal devices 101, 102, 103 may be hardware or software. When the terminal devices 101, 102, 103 are hardware, the terminal devices 101, 102, 103 may be various electronic devices having a display screen and supporting user interaction, including but not limited to, a smart phone, a tablet computer, an electronic book reader, a laptop portable computer and a desktop computer. When the terminal devices 101, 102, 103 are software, the terminal devices 101, 102, 103 may be installed in the electronic devices as listed above, and may be implemented as multiple software pieces or software modules (such as for providing distributed services), or as a single software piece or software module, which is not specifically limited herein.

The server 105 may be a server providing various services, such as a background server providing support for a content of a user interaction object displayed on the terminal devices 101, 102, 103. The background server may perform analysis processing on received user interaction information representing a user interacting with an interaction object, and generate a processing result (such as a probability of a user performing a preset operation).

It should be noted that the server 105 may be hardware or software. When the server 105 is hardware, the server 105 may be implemented as a distributed server cluster composed of multiple servers, or as a single serve. When the server 105 is software, the server 105 may be implemented as multiple software pieces or software modules (such as for providing distributed services), or as a single software piece or software module, which is not specifically limited herein.

It should be noted that the method for processing user interaction information provided by the embodiments of the present disclosure is generally executed by the server 105. Correspondingly, the apparatus for processing user interaction information is generally provided in the server 105.

It should be appreciated that the number of the terminal devices, that of the networks, and that of the servers in FIG. 1 are merely illustrative. Any number of terminal devices, networks, and servers may be provided according to actual requirements.

Figure 2:
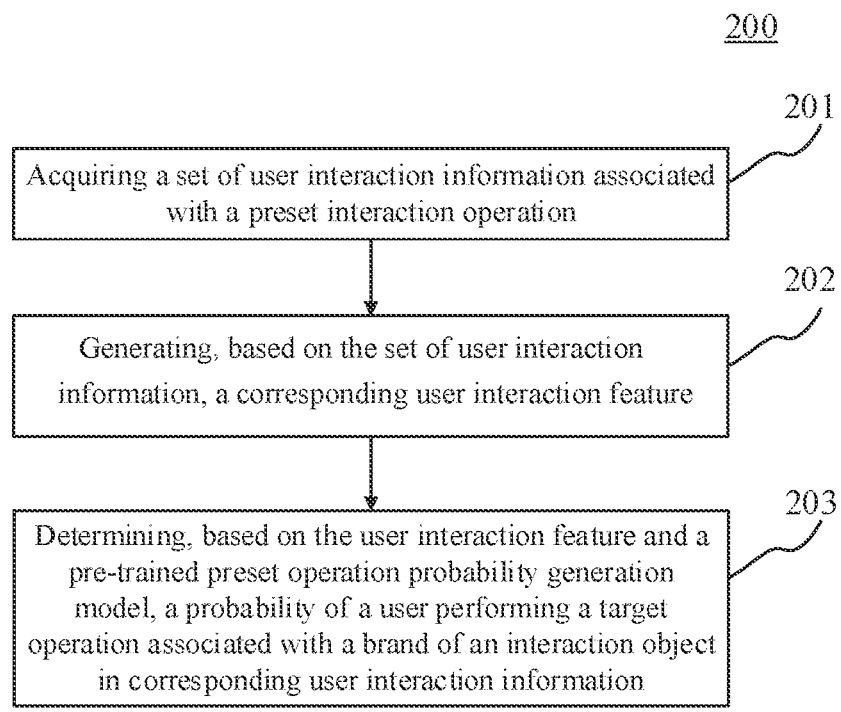
FIG. 2 is a flowchart of an embodiment of a method for processing user interaction information according to the present disclosure.

Further referring to FIG. 2, FIG. 2 shows a flow 200 of an embodiment of a method for processing user interaction information according to the present disclosure. The method for processing user interaction information includes steps 201 to 203.

Step 201 includes acquiring a set of user interaction information associated with a preset interaction operation.

In this embodiment, an execution body of the method for processing user interaction information (such as the server 105 shown in FIG. 1) may acquire the set of user interaction information associated with the preset interaction operation through a wired or wireless connection. The preset interaction operation may be set according to actual applications. The preset interaction operation may include, but is not limited to, at least one of the following items: browsing an interaction object, clicking an interaction object, submitting an order for purchasing a commodity in an interaction object, and searching for a commodity brand keyword. The user interaction information may be information related to the preset interaction operation. Herein, the user interaction information may include category information and brand information of an interaction object, user attribute information, and operation time information an interaction operation corresponding to brand information of the interaction object. The category information of the interaction object may be used to describe a category to which the interaction object belongs. The category information may include a category name. The category information racy further include, but is not limited to, at least one of the following items: the number of brands included under a category and the Herfindahl-Hirschman Index (HHI). The brand information of the interaction object may be information for evaluating a value of the brand of the interaction object. The brand information may include a brand name. The brand information may further include, but is not limited to, at least one of the following items: a brand price index, a market share, a market share ranking, and an average value of scores of commodities belonging to the brand. The user attribute information may be used to construct a user profile. The user attribute information may include, but is not limited to, at least one of the following items: an age, gender, an occupation, and a purchasing power score. The operation time information of the interaction operation corresponding to the brand of the interaction object may be used to represent a time for performing the preset interaction operation on the interaction object of the brand indicated by the brand information. As an example, the interaction object may be an advertisement of a certain commodity.

In this embodiment, the execution body may acquire the set of user interaction information in various ways. As an example, the execution body may acquire the set of user interaction information from a database server. Each piece of information in the set of user interaction information may represent that a certain user performs a preset interaction operation on an interaction object describing a commodity belonging to a certain brand of a certain category at a certain time. As another example, the execution body may firstly acquire original data representing the user interacting with the interaction object from a terminal (such as the terminals 101, 102, 103 shown in FIG. 1). The original data may include the category and brand of the commodity indicated by the interaction object, the user identification information, and the operation time information of the interaction operation. The user identification information may include, but is not limited to, at least one of the following items: a user identification (ID) and a terminal device identification used by the user. The terminal device identification may include, but is not limited to, at least one of the following items: a UDID (Unique Device Identifier) of the terminal device and an identification of a browser client (such as a browser cookie). For example, the original data may be "sports shoes, brand Q, user ID: abc, 2019.3.23 9:15:20". Then, according to the acquired category and brand of the commodity indicated by the interaction object, the execution body may further acquire category information and brand information corresponding to the acquired category and brand from a database server pre-storing a large amount of category information and brand information, thereby obtaining the user interaction information. In practice, the number of categories indicated by the category information may be, for example, 200.

In some, optional implementations of this embodiment, the user interaction information may further be acquired by the following way: extracting the terminal device identification from the user interaction information in response to determining that the user interaction information does not include the user identification. Thereafter, at least one candidate user identification associated with the terminal device identification may be acquired. The user interaction information may include a device identification of the terminal device used by the user initiating the interaction operation, and the candidate user identification may include a user identification having logged in on the terminal device indicated by the terminal device identification. Then, the user interaction information may be associated with the at least one candidate user identification. In these implementations, the user interaction information may be associated with each candidate user identification, or may be associated with a designated candidate user identification in the candidate user identifications. The designated candidate user identification may be determined based on the operation time information of the interaction operation in the user interaction information. For example, the device identification "XXX" of the terminal device used by the user is extracted from the user interaction information. Then, according to the operation time indicated by the operation time information of the interaction operation in the user interaction information, accounts logged in on the device indicated by the device identification "XXX" before and after the operation time are, retrieved, and an account with the minimum time interval between a login time thereof and the operation time is determined as the designated candidate user identification. Further, the execution body may combine the category information and brand information of the interaction object, the user attribute information, and the operation time information of the interaction operation corresponding to the brand information of the interaction object in the interaction information that does not include the user identification, with the interaction information of the associated candidate user identification.

Step 202 includes generating, based on the set of user interaction information, a corresponding user interaction feature.

In this embodiment, based on the set of user interaction information, the execution body may generate the corresponding user interaction feature in various ways. The user interaction feature is used to represent an interaction situation between the user and a specific interaction object. The specific interaction object may be an advertisement of a commodity belonging to a certain brand of a certain category. The specific interaction object may be specified in advance, for example, may be specified as an advertisement of a commodity belonging to brand x of category A. The specific interaction object may further be determined according to actual applications, for example, may be determined as an interaction object with the highest number of clicks or views.

As an example, the execution body may firstly extract the interaction situation between the user and the specific interaction object from the set of user interaction information acquired in step 201. For example, a time when user II clicks an advertisement of a commodity belonging to brand P of category B is extracted. Thereafter, a time when user X clicks an advertisement of a commodity belonging to a different brand of category B (such as brand T of category B) within a preset time interval (such as 1 hour, 3 hours or 1 day) may be extracted. Then, category information and brand information corresponding to the category and brands to which the commodities in the extracted advertisements belong are converted into word vectors. For example, the category information and the brand information may be converted into corresponding numbers according to a preset correspondence table. Then, user attribute information of user X may be converted into a word vector. Finally, the word vectors obtained by converting are combined to form the user interaction feature.

In some optional implementations of this embodiment, the user interaction information may further include a display position of the interaction object, and the user interaction feature may include an interaction operation feature matrix, a user attribute feature vector, a category feature vector, and a brand feature vector. The display position of the interaction object may be represented by a display position of an advertisement on a webpage.

In these implementations, the execution body may generate the corresponding user interaction feature as follows.

A first step includes generating a corresponding initial user interaction operation feature matrix according to the user interaction information.

In these implementations, the execution body may generate the initial interaction operation feature matrix corresponding to the user interaction information based on the category information and brand information of the interaction object, the user attribute information, and the operation time information of the interaction operation corresponding to the brand information of the interaction object in the user interaction information. An element in the initial interaction operation feature matrix may be used to represent an interaction operation feature corresponding to the brand of the interaction object. A row number and a column number of the element in the initial interaction operation feature matrix may be used to identify an operation time of the interaction operation corresponding to the brand of the interaction object and the display position of the interaction object respectively. The element in the initial interaction operation feature matrix may be used, for example, to represent at least one of the following items: indicating the number of interactions with an interaction object of a commodity belonging to the same brand, indicating the number of interactions with an interaction object of a commodity belonging to a different brand of the same category (i.e., a competitor), and indicating the number of interactions with an interaction object of a commodity belonging to a different category.

As an example, the user interaction information includes T time intervals (e.g., may be hours or days) and advertisement display positions. The corresponding initial user interaction operation feature matrix may be a matrix of <T, K, 3> dimensions. Each element in this matrix may be a vector with a length of 3. For example, values of three components included in a vector in a $t^{th}$ row ($1 \le t \le T$) and a $k^{th}$ column ($1 \le k \le K$) may respectively represent the number of times that the user corresponding to the user interaction information clicks or browses commodities, indicated by an advertisement in this user interaction information displayed on the $k^{th}$ advertisement position, belonging to the same brand, those commodities belonging to a different brand of the same category, and those commodities belonging to a different category within the $t^{th}$ time interval. For example, the interaction information may include category information of category A to which commodity XX belongs, brand information of brand Q to which commodity XX belongs, a female user, and an operation time of 2019.3.12 9:05. Time intervals in each day may include three time intervals: 0:00-10:00, 10:00-18:00 and 18:00-24:00. Elements in the first row and the first column of the initial interaction operation feature matrix may be (3, 5, 0). Then, the vector may represent that, in the time interval of 0:00-10:00, the user clicks three times cumulatively for a commodity advertisement of brand Q displayed on the first advertisement position; the user clicks five times cumulatively for a commodity advertisement that belongs to category A but does not belong to brand Q and is displayed on the first advertisement position; and the user does not click a commodity advertisement that does not belong to category A and is displayed on the first advertisement position in practice, the K may be, for example, 15, and a different value of the k may represent, for example, a $k^{th}$ day.

A second step includes converting the initial user interaction operation feature matrix into a corresponding two-dimensional matrix, and using the two-dimensional matrix as a corresponding user interaction operation feature matrix.

In these implementations, the execution body may perform dimension conversion according to the initial interaction operation feature matrix obtained in the first step, and generate the two-dimensional matrix as the corresponding user interaction operation feature matrix.

As an example, the execution body may convert an initial interaction operation feature matrix with dimensions of <T, K, 3> into a two-dimensional matrix with dimensions of <T, K×3>, and use the two-dimensional matrix as the corresponding user interaction operation feature matrix.

A third step includes acquiring the user attribute feature vector generated based on the user attribute information in the user interaction information.

In these implementations, the execution body may acquire the user attribute feature vector from a local or communicatively connected electronic device. The user attribute feature vector may be generated based on the user attribute information in the user interaction information. A generation method may be flexibly selected according to user attribute information. For example, the user attribute information may be "age: 22". The user attribute feature vector may be a numerical value corresponding to the age, or may be a One-Hot Encoding corresponding to an age group to which the age belongs.

A fourth step includes acquiring a category feature vector generated based on information associated with the category of the interaction object in the user interaction information and a brand feature vector generated based on information associated with the brand of the interaction object in the user interaction information.

In these implementations, the execution body may acquire the category feature vector and the brand feature vector from a local or communicatively connected electronic device. The category feature vector may be generated based on the information associated with the category of the interaction object in the user interaction information. The brand feature vector may be generated based on the information associated with the brand of the interaction object in the user interaction information. The generation method may be similar to that for the user attribute feature vector in the third step, and details are not described herein.

Step 203 includes determining, based on the user interaction feature and a pre-trained preset operation probability generation model, a probability of a user performing a target operation associated with the brand of the interaction object in the corresponding user interaction information.

In this embodiment, based on the pre-trained preset operation probability generation model and the user interaction feature generated in step 202, the execution body may determine the probability of the user performing the target operation associated with the brand of the interaction object in the corresponding user interaction information. The target operation may include, but is not limited to, purchasing a commodity of the brand indicated by the interaction object.

As an example, the execution body may input the user interaction feature generated in step 202 into the pre-trained preset operation probability generation model. The pre-trained preset operation probability generation model may be various sequence models pre-trained through a machine learning method, such as a Recurrent Neural Network (RNN), a Long Short-Term Memory (LSTM) and a Bidirectional RNN.

In some optional implementations of this embodiment, the pre-trained preset operation probability generation model may include a long short-term memory network, a first fully-connected network, a second fully-connected network, and a third fully-connected network.

In these implementations, the pre-trained preset operation probability generation model may include at least one preset operation probability generation sub-model corresponding to a category. The user interaction feature may be generated based on the user interaction information, the user interaction information may include the category information of the interaction object, and the category information may indicate a corresponding category. Therefore, the execution body may input the user interaction feature into a preset operation probability generation sub-model matched with a category corresponding to this interaction feature, thereby generating the probability, corresponding to the input interaction feature, of the user performing the target operation associated with the brand of the interaction object in the corresponding user interaction information.

Optionally, the execution body may generate the probability, corresponding to the input interaction feature, of the user performing the target operation associated with the brand of the interaction object in the corresponding user interaction information according to the following steps.

A first step includes inputting the user interaction operation feature matrix generated according to the set of user interaction information into the long short-term memory network in the preset operation probability generation sub-model matched with the category corresponding to the input user interaction feature, to generate a corresponding first implicit feature.

In these implementations, an implicit state number H of the first implicit feature may be generally set between 128 and 512, for example, may be selected as 256.

A second step includes inputting the user attribute feature vector generated according to the set of user interaction information into the first fully-connected network in the preset operation probability generation sub-model matched with the category corresponding to the input user interaction feature, to generate a corresponding second implicit feature.

In these implementations, an activation function of the first fully-connected network may take, for example, a tan h function.

A third step includes inputting the category feature vector and the brand feature vector generated according to the set of user interaction information into the second fully-connected network in the preset operation probability generation sub-model matched with the category corresponding to the input user interaction feature, to generate a corresponding third implicit feature.

In these implementations, an activation function of the second fully-connected network may take, for example, a tan h function.

A fourth step includes inputting the generated first implicit feature, the second implicit feature, and the third implicit feature into the third fully-connected network in the preset operation probability generation sub-model matched with the category corresponding to the input user interaction feature, to generate the probability, corresponding to the input interaction feature, of the user performing the target operation associated with the brand of the interaction object in the corresponding user interaction information.

In these implementations, an activation function or the third fully-connected network may take, for example, a tan h function.

In these implementations, the preset operation probability generation sub-model may be generated by training through the following steps.

A first step includes acquiring a set of training samples. Each training sample in the set of training samples may include sample user interaction information and sample labeling information corresponding to the sample user interaction information. The sample user interaction information may include category information and brand information of an interaction object, user attribute information, and operation time information of an interaction operation corresponding to the brand information of the interaction object. The sample labeling information may be used to represent whether a sample user performs a target operation associated with the brand of the interaction object in the corresponding sample user interaction information. A category indicated by the category information in each piece of sample user interaction information in the set of training samples is consistent. For example, the categories indicated by the category information in the set of training samples are "women's clothing".

In these implementations, the training samples may be obtained in various ways. As an example, the execution body that acquires the set of training samples may acquire historical data as in step 201, and generate the sample user interaction information based on the acquired historical data. Thereafter, the execution body may determine sample labeling information corresponding to historical data representing performing the target operation associated with the brand of the interaction object in the corresponding sample user interaction information (e.g., purchasing a commodity of this brand) as 1, and determine sample labeling information corresponding to historical data representing no target operation being performed as 0. Then, the sample user interaction information may be stored in association with corresponding sample labeling information, to finally obtain the training samples. A large number of training samples are formed through a large amount of historical data, thereby forming a set of training samples.

Optionally, in practice, if the number of training samples with sample labeling information of (i.e., positive examples) is smaller than the number of training samples with sample labeling information of 0 (i.e., negative examples), the execution body acquiring the set of training samples may retain the same number of the negative examples as the positive examples by a random sampling method.

A second step includes generating a corresponding sample user interaction feature based on the sample user interaction information in the set of training samples.

In these implementations, based on the sample user interaction information of the set of training samples acquired in the second step, the execution body for training the preset operation probability generation sub-model may generate the corresponding sample user interaction feature by a method similar to step 202 in the previous embodiment, and details are not described herein.

A third step includes using the generated sample user interaction feature as an input, and using sample labeling information corresponding to the input sample interaction feature as an expected output, for training to obtain the preset operation probability generation sub-model corresponding to a category of the interaction object in the sample user interaction information.

In these implementations, the execution body for training the preset operation probability generation sub-model may input the generated sample interaction feature into an initial model, to obtain a probability of a sample user performing the target operation associated with the brand of the interaction object in the corresponding sample user interaction information. Then, a degree of difference between the obtained probability and the sample labeling information corresponding to the input sample interaction feature may be calculated by using a preset loss function. Thereafter, a network parameter of the initial model may be adjusted based on the obtained degree of difference, and the training is ended in a case that a preset training end condition is satisfied. Finally, the initial model obtained by training may be determined as the preset operation probability generation sub-model corresponding to the category that corresponds to the sample interaction feature. Further, according to the network parameter (e.g., a weight of a network neuron) of the preset operation probability generation sub-model obtained by training, information that has a greater impact on the finally generated probability in the user interaction information may be further determined.

It should be noted that the loss function may take a logarithmic loss function. The preset training end condition may include, but is not limited to, at least one of the following items: a training time exceeding a preset duration, the number of training times exceeding a preset number, a calculated degree of difference being less than a preset difference threshold, an accuracy on a test set reaching a preset accuracy threshold, and a coverage on a test set reaching a preset coverage threshold. The method of adjusting the network parameter of the initial model may include, but is not limited to, at least one of the following items: a BP (Back Propagation) algorithm and a SGD (Stochastic Gradient Descent) algorithm.

In some optional implementations of this embodiment, the execution body may further generate and push inventory adjustment information corresponding to the interaction object according to the generated probability of the user performing the target operation associated with the brand of the interaction object in the corresponding user interaction information.

In these implementations, the generated probability may be used to indicate a possibility of the user purchasing a commodity of a certain brand. The execution body may further calculate the number of generated probabilities greater than a preset threshold. Then, the execution body may generate the inventory adjustment information for adjusting commodities of a corresponding brand according to the calculated number. Optionally, the execution body may transmit the generated inventory adjustment information to a target device. The target device may be a device for controlling distribution of commodities in a logistics warehouse. Thus, support can be provided for commodity preparation and inventory management.

Figure 3:
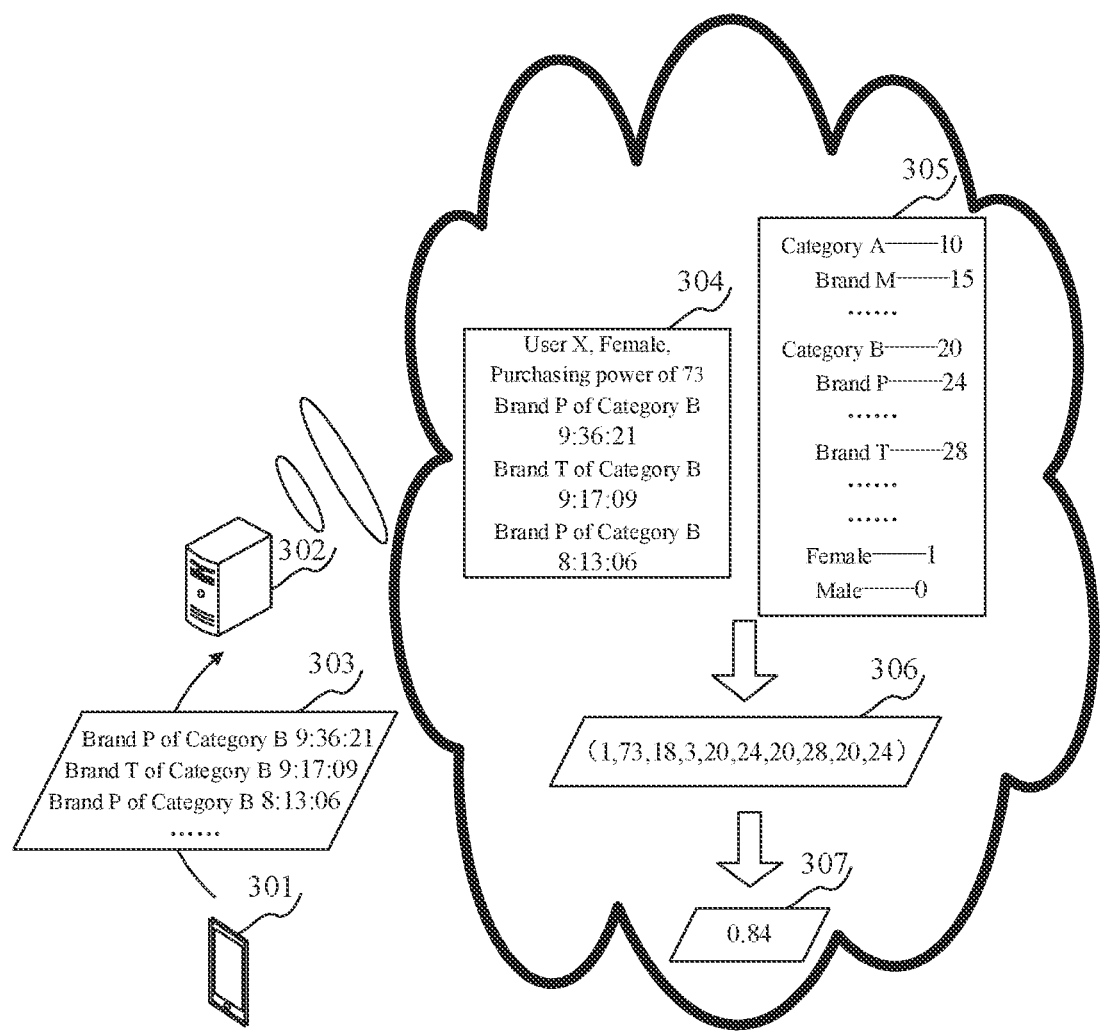
FIG. 3 is a schematic diagram of an application scenario of an embodiment of the method for processing user interaction information according to the present disclosure.

Further referring to FIG. 3, FIG. 3 is a schematic diagram of an application scenario of the method for processing user interaction information according to an embodiment of the present disclosure. In the application scenario of FIG. 3, a user logs in to a user account X using the terminal device 301 and then browses an e-commerce webpage. In the log 303 of the background web server 302, clicks of user account X to advertisements with different contents at different times is recorded. The background web server 302 may acquire the user account and information of advertisements of commodities belonging to a certain brand of a certain category according to the contents recorded in the log 303. For example, the gender corresponding to the user account X is "female", the purchasing power index of the user account is 73, the number of brands included under category B is 18, and the comprehensive ranking of brand P under category B is $3^{th}$, and thus a set 304 of user interaction information is formed. Then, the background web server 302 may generate an interaction feature 306 corresponding to the user account X according to a preset correspondence table 305. The interaction feature may represent that the female user X with the purchasing power index of 73 sequentially clicked, within one hour, an advertisement of a commodity belonging to brand P of category B, an advertisement of a commodity belonging to brand T of category B, and an advertisement of a commodity belonging to brand P of category B. Category B corresponds to a number 20, brand P corresponds to number 24, and brand T corresponds to number 28. Then, the background web server 302 may input the interaction feature 306 into a pre-trained preset operation probability generation model to generate a probability 307 of the user purchasing a commodity belonging to brand P of category B, which is 0.84.

At present, in one of the related technologies, prediction for a future purchase behavior is generally performed based on historical records such as a click, browse and purchase of a user, while ignoring the impact of a specific interaction object (such as a click or exposure of an advertisement). In one of the related technologies, generally, a shallow model such as Logistic Regression (LR) and a Gradient Boosting Decision Tree (GBDT) is further used, resulting in failing to capture a time series feature of user behavior. However, according to the method provided in the embodiments of the present disclosure, by acquiring the set of user interaction information associated with the preset interaction operation, it is achieved that the influence of different interaction behaviors of the user to the interaction object (for example, an advertisement of a commodity belonging to a different brand of a different category) on the probability of the user performing a target operation (for example, purchasing a commodity belonging to a certain brand of a certain category) can be comprehensively considered. Since the time of the interaction behavior is included in the set of user interaction information, thus a relevant time series feature can be extracted, so that the prediction is more accurate. Further, the stock and inventory management of the e-commerce may also be guided according to the obtained probability of the user performing the target operation (such as purchasing a commodity belonging to a certain brand of a certain category).

Figure 4:
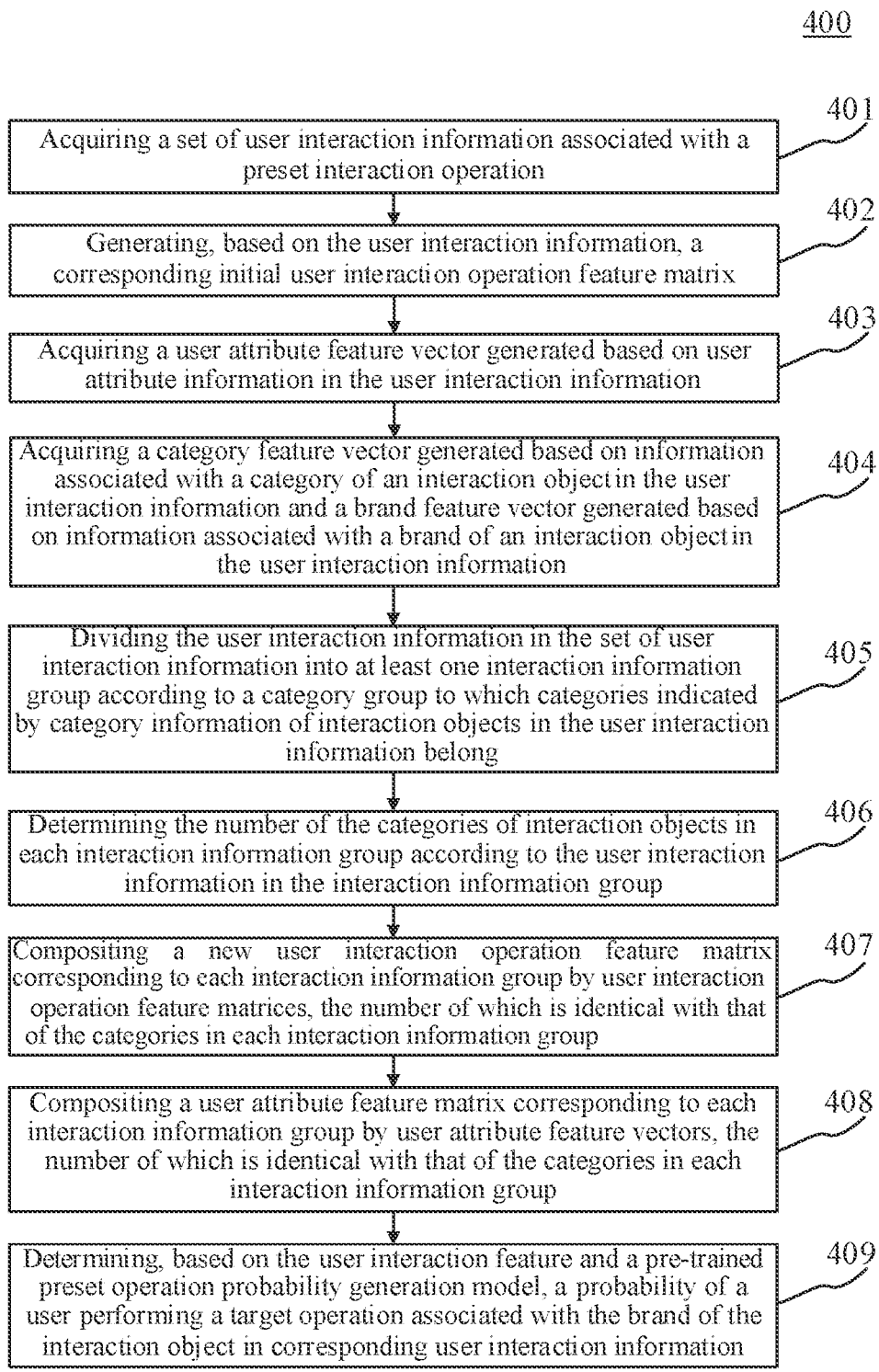
FIG. 4 is a flowchart of another embodiment of the method for processing user interaction information according to the present disclosure.

Further referring to FIG. 4, FIG. 4 shows a flow 400 of another embodiment of the method for processing user interaction information. The flow 400 of the method for processing interaction information includes steps 401 to 409.

Step 401 includes acquiring a set of user interaction information associated with a preset interaction operation.

Step 402 includes generating, based on the user interaction information, a corresponding initial user interaction operation feature matrix.

Step 403 includes acquiring a user attribute feature vector generated based on user attribute information in the user interaction information.

Step 404 includes acquiring a category feature vector generated based on information associated with a category of an interaction object in the user interaction information and a brand feature vector generated based on information associated with a brand of an interaction object in the user interaction information.

Step 401 is consistent with step 201 in the previous embodiment, and the description of step 201 is also applicable to step 401. A specific implementation of steps 402 to 404 may correspondingly refer to step 202 in the previous embodiment, and details are not described herein.

Step 405 includes dividing the user interaction information in the set of user interaction information into at least one interaction information group according to a category group to which categories indicated by category information of interaction objects in the user interaction information belong.

In this embodiment, the execution body may divide the user interaction information in the set of user interaction information into at least one interaction information group according to the category group to which the categories indicated by the category information of the interaction objects in the user interaction information belong. The category group may be obtained by dividing based on a correlation among the categories indicated by the category information. The correlation among the categories may be preset, or may also be determined according to whether a similarity is greater than a preset correlation threshold. Generally, a size of the preset correlation threshold often affects the number of categories included in the category group. In practice, the number of categories is often related to the parameter of the preset operation probability generation sub-model. For example, like the meanings of T (a total number of time intervals included in the user interaction information), K (a total number of advertisement display positions), and H (an implicit state number of the first implicit feature) in the previous embodiment, an average value of the number of categories included in each category group is set to be $\overline{M}$, such that a value of $\overline{M} \times T \times K \times H$ generally does not exceed 100,000,000.

Step 406 includes determining the number of the categories of the interaction objects in each interaction information group according to the user interaction information in the interaction information group.

In this embodiment, for the at least one interaction information group obtained by dividing in step 406, the execution body may determine the number of categories of the interaction objects in each interaction information group. Generally, as the same batch of inputs of the preset operation probability generation model, the categories indicated by the category information of the interaction objects in the interaction information group are different.

Step 407 includes compositing a new user interaction operation feature matrix corresponding to each interaction information group by user interaction operation feature matrices, the number of which is identical with that of the categories in each interaction information group.

In this embodiment, for each category group, the execution body may composite, by using a matrix conversion, the new user interaction operation feature matrix by the user interaction operation feature matrices, the number of which is identical with that of the categories.

As an example, the number of categories of interaction objects in a certain category group may be M. The user interaction operation feature matrix X may be a two-dimensional matrix with dimensions of <T, K×3>. The execution body may form the new interaction operation feature matrix as $X'=X \times F_X$. $F_X$ may be a block matrix with dimensions of <K×3, M×K×3>, each block is a square matrix of <K×3, K×3>, and M represents M blocks in total. For the $i^{th}$ ($1 \le i \le M$) category in the category group, the $i^{th}$ square matrix of the block matrix is an identity matrix, and the other square matrices are zero matrices.

Step 408 includes compositing a user attribute feature matrix corresponding to each interaction information group by user attribute feature vectors, the number of which is identical with that of the categories in each interaction information group.

In this embodiment, for each category group, the execution body may composite the user attribute feature vectors, the number of which is identical with that of the categories, into the user attribute feature matrix by using a matrix conversion.

As an example, the number of categories of interaction objects in a certain category group may be M. The user attribute feature vector U may be a vector with a dimension of $N_2$. The execution body may form the user attribute feature matrix as $U'=U \times F_U$. $F_U$ may be a block matrix with dimensions of $<N_2, M \times N_2>$, each block is a square matrix of $<N_2, N_2>$, and M represents M blocks in total. For the $i^{th}$ category ($1 \leq i \leq M$) category in the category group, the $i^{th}$ square matrix of the block matrix is an identity matrix, and the other square matrices are zero matrices.

Step 409 includes determining, based on the user interaction feature and a pre-trained preset operation probability generation model, a probability of a user performing a target operation associated with the brand of the interaction object in the corresponding user interaction information.

In this embodiment, step 409 may be consistent with step 203 in the previous embodiment. The description for step 203 is also applicable to step 409, and details are not described herein.

It should be noted that, since the dimension of the user interaction feature, as input of the preset operation probability generation model, changes, the network parameter of the preset operation probability generation model also changes accordingly. The output of the preset operation probability generation model may be a vector with a dimension identical to the number of square matrices (e.g., M) in the input user interaction feature. Each element of the output vector is a probability output result corresponding to each category that corresponds to the input user interaction feature.

In some optional implementations of this embodiment, the execution body may generate the probability, corresponding to the input user interaction feature, of the user performing the target operation associated with the brand of the interaction object in the corresponding user interaction information, according to the following steps.

A first step includes inputting the composited new interaction operation feature matrix into the long short-term memory network in a corresponding preset operation probability generation model according to a category group corresponding to the new interaction operation feature matrix, to generate a new first implicit feature.

A second step includes inputting the composited user attribute feature matrix into the first fully-connected network in the corresponding preset operation probability generation model, to generate a new second implicit feature.

A third step includes inputting the generated category feature vector and brand feature vector into the second fully-connected network in the corresponding preset operation probability generation model, to generate a third implicit feature.

A fourth step includes inputting the generated new first implicit feature, the new second implicit feature, and the third implicit feature into the third fully-connected network in the corresponding preset operation probability generation model, to generate the probability, corresponding to the input user interaction feature, of the user performing the target operation associated with the brand of the interaction object in the corresponding user interaction information.

It should be noted that the training of the preset operation probability generation model is similar to that described in step 203 in the previous embodiment. The difference includes that after the sample interaction feature is generated based on the training sample, the dimension of the sample interaction feature is converted in a way described in steps 406 to 409, and the preset operation probability generation model corresponding to the dimension of the input sample interaction feature is obtained by training through a machine learning method. Thus, the preset operation probability generation model obtained by training corresponds to the category group to which the categories corresponding to the input sample interaction feature belong. When the number of categories is relatively large, preset operation probability generation models corresponding to category groups, each including multiple relevant categories, are trained in parallel, so that calculation resources can be greatly saved, and a training speed of the models can be improved. In practice, when the number of categories is 200, at least 200 4-card GPU (Graphics Processing Unit) machines are required to individually train the preset operation probability generation sub-model for each category, and a training time exceeds 24 hours. When the 200 categories are divided into 7 relevant category groups and 7 preset operation probability generation models corresponding to the category groups are trained in parallel, only 7 4-card GPU machines are required.

In some optional implementations of this embodiment, the execution body may further generate and push inventory adjustment information corresponding to the interaction object according to the generated probability of the user performing the target operation associated with the brand of the interaction object in the corresponding user interaction information.

In these implementations, a specific implementation may be described with reference to the previous embodiment, and details are not described herein.

As can be seen from FIG. 4, the flow 400 of the method for processing user interaction information in this embodiment embodies the steps of obtaining the groups of the interaction information by dividing according to the correlation between the categories and generating the new interaction operation feature matrices and user attribute feature matrices corresponding to each group of the interaction information. Thus, according to the solution described in this embodiment, when the number of categories indicated by the category information included in the set of user interaction information is great (for example, greater than 10), the new interaction feature corresponding to the category group can be generated through the matrix conversion using the feature corresponding to the multiple categories, and then be input into the preset operation probability generation model to obtain the result corresponding to the multiple categories in the category group. In addition, through the preset operation probability generation model corresponding to the input new user interaction feature, parallel training of models of multiple related categories are realized, thereby effectively saving calculation resources and improving a training efficiency of the models.

Figure 5:
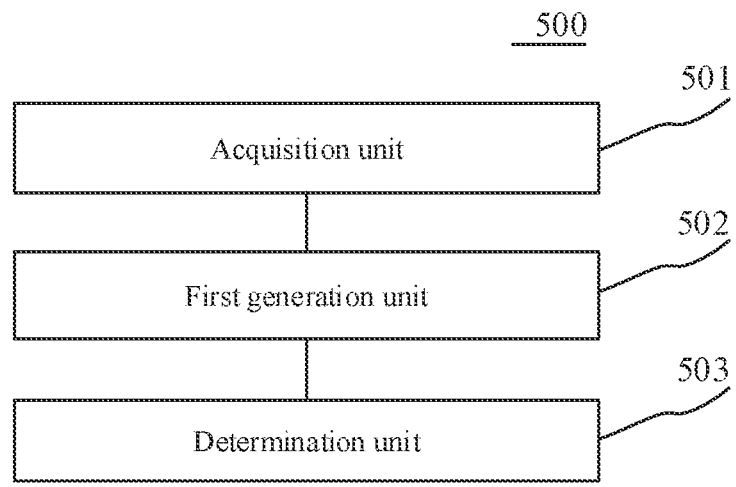
FIG. 5 a schematic structural diagram of an embodiment of an apparatus for processing user interaction information according to the present disclosure.

Further referring to FIG. 5, as an implementation of the method shown in each of the above figures, the present disclosure provides an embodiment of an apparatus for processing user interaction information. The embodiment of the apparatus corresponds to the embodiment of the method shown in FIG. 2, and the apparatus is particularly applicable to various electronic devices.

As shown in FIG. 5, the apparatus 500 for processing user interaction information provided by this embodiment includes: an acquisition unit 501, a first generation unit 502 and a determination unit 503. The acquisition unit 501 is configured to acquire a set of user interaction information associated with a preset interaction operation, where the user interaction information includes: category information and brand information of an interaction object, user attribute information, and operation time information of an interaction operation corresponding to a brand of the interaction object; the first generation unit 502 is configured to generate, based on the set of user interaction information, a corresponding user interaction feature; and the determination unit 503 configured to determine, based on the user interaction feature and a pre-trained preset operation probability generation model, a probability of a user performing a target operation associated with a brand of an interaction object in the corresponding user interaction information.

In this embodiment, in the apparatus 500 for processing user interaction information, the specific processing of the acquiring unit 501, the first generation unit 502, and the determination unit 503 and the technical effects thereof may be described with reference to step 201, step 202 and step 203 in the embodiment corresponding to FIG. 2 respectively, and details are not described herein.

In some optional implementations of this embodiment, the pre-trained preset operation probability generation model includes a long short-term memory network, a first fully-connected network, a second fully-connected network, and a third fully-connected network.

In some optional implementations of this embodiment, the user interaction information further includes a display position of the interaction object, and the user interaction feature includes an interaction operation feature matrix, a user attribute feature vector, a category feature vector, and a brand feature vector; and the first generation unit 502 may include: a first generation module (not shown), a conversion module (not shown), a first acquisition module (not shown) and a second acquisition module (not shown). The first generation module is configured to generate, based on the user interaction information, a corresponding initial user interaction operation feature matrix, where an element in the initial interaction operation feature matrix is used to represent an interaction operation feature corresponding to the brand of the interaction object, and a row number and a column number of the element in the initial interaction operation feature matrix are used to identify an operation time of the interaction operation corresponding to the brand of the interaction object and the display position of the interaction object respectively; the conversion module is configured to convert the initial user interaction operation feature matrix into a corresponding two-dimensional matrix, and use the two-dimensional matrix as a corresponding user interaction operation feature matrix; the first acquisition module is configured to acquire the user attribute feature vector generated based on the user attribute information in the user interaction information; and the second acquisition module is configured to acquire the category feature vector generated based on information associated with a category of the interaction object in the user interaction information and the brand feature vector generated based on information associated with the brand of the interaction object in the user interaction information.

In some optional implementations of this embodiment, the pre-trained preset operation probability generation model may include at least one preset operation probability generation sub-model corresponding to the category; and the determination unit 503 is further configured to: input the user interaction feature generated according to the set of user interaction information into the preset operation probability generation sub-model matched with the category of the interaction object corresponding to the input interaction feature, to generate the probability, corresponding to the input interaction feature, of the user performing the target operation associated with the brand of the interaction object in the user interaction information.

In some optional implementations of this embodiment, the determination unit 503 may include: a second generation module (not shown), a third generation module (not shown), a fourth generation module (not shown) and a fifth generation module (not shown). The second generation module is configured to input the user interaction operation feature matrix generated according to the set of user interaction information into the long short-term memory network in the preset operation probability generation sub-model matched with the category corresponding to the input user interaction feature, to generate a corresponding first implicit feature; the third generation module is configured to input the user attribute feature vector generated according to the set of user interaction information into the first fully-connected network in the preset operation probability generation sub-model matched with the category corresponding to the input user interaction feature, to generate a corresponding second implicit feature; the fourth generation module is configured to input the category feature vector and the brand feature vector generated according to the set of user interaction information into the second fully-connected network in the preset operation probability generation sub-model matched with the category corresponding to the input user interaction feature, to generate a corresponding third implicit feature; and the fifth generation module is configured to input the generated first implicit feature, the second implicit feature, and the third implicit feature into the third fully-connected network in the preset operation probability generation sub-model matched with the category corresponding to the input user interaction feature, to generate the probability, corresponding to the input interaction feature, of the user performing the target operation associated with the brand of the interaction object in the user interaction information.

In some optional implementations of this embodiment, the preset operation probability generation sub-model is generated by training through following steps of: acquiring a set of training samples, where a training sample includes sample user interaction information and sample labeling information corresponding to the sample user interaction information, the sample user interaction information includes category information and brand information of an interaction object, user attribute information and operation time information of an interaction operation corresponding to a brand of the interaction object, the sample labeling information is used to represent whether a sample user performs a target operation associated with a brand of an interaction object in corresponding sample user interaction information, and a category in each piece of sample user interaction information in the set of training samples is consistent; generating, based on the sample user interaction information in the set of training samples, a corresponding sample user interaction feature; and using the generated sample user interaction feature as an input, and using sample labeling information corresponding to the input sample interaction feature as an expected output, for training to obtain the preset operation probability generation sub-model corresponding to the category of the interaction object in the sample user interaction information.

In some optional implementations of this embodiment, the user interaction information is acquired by: extracting, in response to determining that the user interaction information does not include a user identification, a terminal device identification from the user interaction information; and acquiring at least one candidate user identification associated with the terminal device identification, and associating the user interaction information with the at least one candidate user identification.

In some optional implementations of this embodiment, the first generation unit 502 may further include: a dividing module (not shown), a determination module (not shown), a first compositing module (not shown), a second compositing module (not shown). The dividing module is configured to divide the user interaction information in the set of user interaction information into at least one interaction information group according to a category group to which categories indicated by category information of interaction objects in the user interaction information belong, where the category group is obtained by dividing based on a correlation among the categories indicated by the category information; the determination module is configured to determine a number of the categories of the interaction objects in each interaction information group according to the user interaction information in the interaction information group; the first compositing module is configured to composite a new user interaction operation feature matrix corresponding to each interaction information group by user interaction operation feature matrices, a number of which is identical with the number of categories in the each interaction information group; and the second compositing module is configured to composite a user attribute feature matrix corresponding to the each interaction information group by user attribute feature vectors, a number of which is identical with the number categories in the each interaction information group.

In some optional implementations of this embodiment, the preset operation probability generation model may correspond to the category group; and the determination unit 503 may include: a fifth generation module (not shown), a sixth generation module (not shown), a seventh generation module (not shown) and an eighth generation module (not shown). The fifth generation module is configured to input the composited new interaction operation feature matrix into the long short-term memory network in a corresponding preset operation probability generation model according to a category group corresponding to the new interaction operation feature matrix, to generate a new first implicit feature; the sixth generation module is configured to input the composited user attribute feature matrix into the first fully-connected network in the corresponding preset operation probability generation model, to generate a new second implicit feature; the seventh generation module is configured to input the generated category feature vector and brand feature vector into the second fully-connected network in the corresponding preset operation probability generation model, to generate a third implicit feature; and the eighth generation module is configured to input the generated new first implicit feature, the new second implicit feature, and the third implicit feature into the third fully-connected network in the corresponding preset operation probability generation model, to generate the probability, corresponding to the input user interaction feature, of the user performing the target operation associated with the brand of the interaction object in the user interaction information.

In some optional implementations of this embodiment, the apparatus 500 for processing user interaction information may further include: a second generation unit (not shown) configured to generate and push inventory adjustment information corresponding to the interaction object according to the generated probability of the user performing the target operation associated with the brand of the interaction object in the corresponding user interaction information.

According to the apparatus for processing user interaction information, the set of user interaction information associated with the preset interaction operation is acquired through the acquisition unit 501, where the user interaction information includes: the category information and brand information of the interaction object, the user attribute information, and the operation time information of the interaction operation corresponding to the brand of the interaction object; then, the first generation unit 502 generates the corresponding user interaction feature based on the set of user interaction information; and the determination unit 503 determines the probability of the user performing the target operation associated with the brand of the interaction object in the corresponding user interaction information based on the user interaction feature and the pre-trained preset operation probability generation model. It is achieved that the probability of the user performing the target operation associated with the brand of the interaction object in the corresponding user interaction information is determined based on the user interaction information, so that data support is provided for the e-commerce decision.

Figure 6:
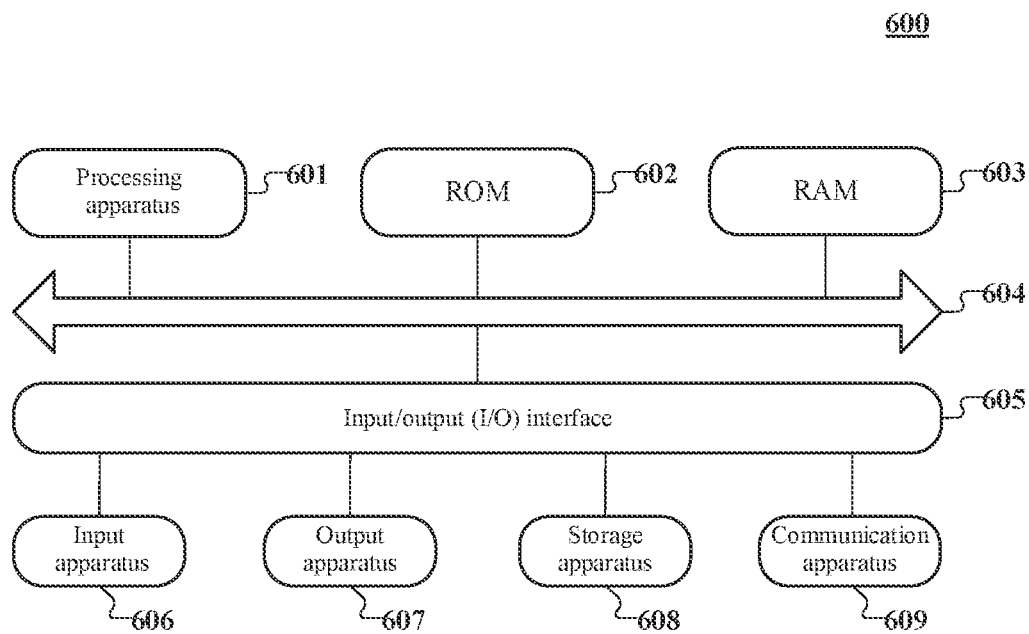
FIG. 6 is a schematic structural diagram of an electronic device adapted to implement embodiments of the present disclosure.

Referring to FIG. 6, FIG. 6 shows a schematic structural diagram of an electronic device 600 (such as the server in FIG. 1) adapted to implement some embodiments of the present disclosure. The server shown in FIG. 6 is merely an example and should not be construed as limiting the functionality and use scope of the embodiments of the present disclosure.

As shown in FIG. 6, the electronic device 600 may include a processing apparatus 601 (such as a central processing unit and a graphic processor), which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including a touch screen, a touchpad, a keyboard, a mouse and the like; an output apparatus 607 including a liquid crystal display (LCD), a speaker, a vibrator and the like; a storage apparatus 608 including a magnetic tap, a hard disk and the like; and a communication apparatus 609. The communication apparatus 609 may allow the electronic device 600 to perform wireless or wired communication with other devices to exchange data. Although FIG. 6 shows the electronic device 600 having various apparatuses, it should be appreciated that it is not required to implement or provide all the shown apparatuses, and it may alternatively be implemented or provided with more or fewer apparatuses. Each block shown in FIG. 6 may represent one apparatus or multiple apparatuses according to requirements.

In particular, according to some embodiments of the present disclosure, the process described above with reference to the flowchart may be implemented as a computer software program. For example, some embodiments of the present disclosure include a computer program product, which includes a computer program carried on a computer readable medium. The computer program includes program codes for executing the method shown in the flowchart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functionalities as defined by the method of some embodiments of the present disclosure.

It should be noted that the computer readable medium described by some embodiments of the present disclosure may be computer readable signal medium or computer readable storage medium or any combination of the above two. The computer readable storage medium may be, but is not limited to: an electric, magnetic, optical, electromagnetic, infrared, or semiconductor system, an apparatus, an element, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium, may be any physical medium containing or storing programs which can be used by or in combination with an instruction execution system, an apparatus or an element. In some embodiments of the present disclosure, the computer readable signal medium may include a data signal in the base band or propagating as a part of a carrier, in which computer readable program codes are carried. The propagating signal may be various forms, including but not limited to: an electromagnetic signal, an optical signal or any suitable combination of the above. The computer readable signal medium may be any computer readable medium except for the computer readable storage medium. The computer readable signal medium is capable of transmitting, propagating or transferring programs for use by or in combination with an instruction execution system, an apparatus or an element. The program codes contained on the computer readable medium may be transmitted with any suitable medium including but not limited to: a wire, an optical cable, RF (Radio Frequency), or any suitable combination of the above.

The above computer readable medium may be included in the electronic device; or may alternatively be present alone and not assembled into the electronic device. The computer readable medium carries one or more programs that, when executed by the electronic device, cause the electronic device to: acquire a set of user interaction information associated with a preset interaction operation, where the user interaction information includes: category information and brand information of an interaction object, user attribute information, and operation time information of an interaction operation corresponding to a brand of the interaction object; generate a corresponding user interaction feature based on the set of user interaction information; and determine a probability of a user performing a target operation associated with the brand of the interaction object in the corresponding user interaction information based on the user interaction feature and a pre-trained preset operation probability generation model.

A computer program code for executing operations of some embodiments of the present disclosure may be written in one or more programming languages or a combination thereof. The programming languages include object-oriented programming languages, such as Java, Smalltalk or C++, and also include conventional procedural programming languages, such as "C" language or similar programming languages. The program code may be completely executed on a user computer, partially executed on a user computer, executed as a separate software package, partially executed on a user computer and partially executed on a remote computer, or completely executed on a remote computer or server. In a case involving a remote computer, the remote computer may be connected to a user computer through any kind of network, including a local area network (LAN) or a wide area network (WAN), or may be connected to an external computer (for example, connected through Internet using an Internet service provider).

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor, including an acquisition unit, a first generation unit and a determination unit, where the names of these units do not constitute a limitation to such units themselves in some cases. For example, the acquisition unit may alternatively be described as "a unit of acquiring a set of user interaction information associated with a preset interaction operation, where the user interaction information includes: category information and brand information of an interaction object, user attribute information, and operation time information of an interaction operation corresponding to a brand of the interaction object".

The above description only provides an explanation of the preferred embodiments of the present disclosure and the technical principles used. It should be appreciated by those skilled in the art that the inventive scope involved in the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A method for processing user interaction information, comprising:
acquiring a set of user interaction information associated with a preset interaction operation, wherein the user interaction information comprises: category information and brand information of an interaction object, user attribute information, and operation time information of an interaction operation corresponding to a brand of the interaction object;

generating, based on the set of user interaction information, a corresponding user interaction feature;

determining, based on the user interaction feature and a pre-trained preset operation probability generation model, probabilities of users performing a target operation associated with a target brand of a target interaction object in corresponding user interaction information, wherein the target operation comprises purchasing a commodity of the target brand;

determining probabilities greater than a preset threshold from the probabilities of the users performing the target operation associated with the target brand, and determining a number of the probabilities greater than the preset threshold;

generating inventory adjustment information according to the number of the probabilities greater than the preset threshold; and controlling a target device to distribute commodities in a logistics warehouse based on the inventory adjustment information.

2. The method according to claim 1, wherein the pre-trained preset operation probability generation model comprises a long short-term memory network, a first fully-connected network, a second fully-connected network, and a third fully-connected network.

3. The method according to claim 2, wherein the user interaction information further comprises a display position of the interaction object, and the user interaction feature comprises an interaction operation feature matrix, a user attribute feature vector, a category feature vector, and a brand feature vector; and generating, based on the set of user interaction information, the corresponding user interaction feature comprises:

generating, based on the user interaction information, a corresponding initial user interaction operation feature matrix, wherein an element in the initial interaction operation feature matrix is used to represent an interaction operation feature corresponding to the brand of the interaction object, and a row number and a column number of the element in the initial interaction operation feature matrix are used to identify an operation time of the interaction operation corresponding to the brand of the interaction object and the display position of the interaction object respectively;

converting the initial user interaction operation feature matrix into a corresponding two-dimensional matrix, and using the two-dimensional matrix as a corresponding user interaction operation feature matrix;

acquiring the user attribute feature vector generated based on the user attribute information in the user interaction information; and acquiring the category feature vector generated based on information associated with a category of the interaction object in the user interaction information and the brand feature vector generated based on information associated with the brand of the interaction object in the user interaction information.

4. The method according to claim 3, wherein the pre-trained preset operation probability generation model comprises at least one preset operation probability generation sub-model corresponding to the category; and determining, based on the user interaction feature and the pre-trained preset operation probability generation model, the probability of the user performing the target operation associated with the target brand of target the interaction object in the corresponding user interaction information comprises:

inputting the user interaction feature generated according to the set of user interaction information into the preset operation probability generation sub-model matched with the category of the interaction object corresponding to the input interaction feature, to generate the probability, corresponding to the input interaction feature, of the user performing the target operation associated with the target brand of the target interaction object in the user interaction information.

5. The method according to claim 4, wherein inputting the user interaction feature generated according to the set of user interaction information into the preset operation probability generation sub-model matched with the category of the interaction object corresponding to the input interaction feature, to generate the probability, corresponding to the input interaction feature, of the user performing the target operation associated with the target brand of the target interaction object in the user interaction information, comprises:

inputting the user interaction operation feature matrix generated according to the set of user interaction information into the long short-term memory network in the preset operation probability generation sub-model matched with the category corresponding to the input user interaction feature, to generate a corresponding first implicit feature;

inputting the user attribute feature vector generated according to the set of user interaction information into the first fully-connected network in the preset operation probability generation sub-model matched with the category corresponding to the input user interaction feature, to generate a corresponding second implicit feature;

inputting the category feature vector and the brand feature vector generated according to the set of user interaction information into the second fully-connected network in the preset operation probability generation sub-model matched with the category corresponding to the input user interaction feature, to generate a corresponding third implicit feature; and inputting the generated first implicit feature, the second implicit feature, and the third implicit feature into the third fully-connected network in the preset operation probability generation sub-model matched with the category corresponding to the input user interaction feature, to generate the probability, corresponding to the input user interaction feature, of the user performing the target operation associated with the target brand of the target interaction object in the user interaction information.

6. The method according to claim 5, wherein the preset operation probability generation sub-model is generated by training through following steps of:

acquiring a set of training samples, wherein a training sample comprises sample user interaction information and sample labeling information corresponding to the sample user interaction information, the sample user interaction information comprises sample category information and sample brand information of a sample interaction object, sample user attribute information and sample operation time information of a sample interaction operation corresponding to a sample brand of the sample interaction object, the sample labeling information is used to represent whether a sample user performs a sample target operation associated with a target sample brand of a target sample interaction object in corresponding sample user interaction information, and a category in each piece of sample user interaction information in the set of training samples is consistent;

generating, based on the sample user interaction information in the set of training samples, a corresponding sample user interaction feature; and using the generated sample user interaction feature as an input, and using sample labeling information corresponding to the input sample interaction feature as an expected output, for training to obtain the preset operation probability generation sub-model corresponding to the category of the interaction object in the sample user interaction information.

7. The method according to claim 1, wherein the user interaction information is acquired by:

extracting, in response to determining that the user interaction information does not comprise a user identification, a terminal device identification from the user interaction information; and acquiring at least one candidate user identification associated with the terminal device identification, and associating the user interaction information with the at least one candidate user identification.

8. The method according to claim 3, wherein generating, based on the set of user interaction information, the corresponding user interaction feature, further comprises:

dividing the user interaction information in the set of user interaction information into at least one interaction information group according to a category group to which categories indicated by category information of interaction objects in the user interaction information belong, wherein the category group is obtained by dividing based on a correlation among the categories indicated by the category information;

determining a number of categories of the interaction objects in each interaction information group according to the user interaction information in the interaction information group;

compositing a new user interaction operation feature matrix corresponding to each interaction information group by user interaction operation feature matrices, a number of the user interaction operation feature matrices being identical with the number of categories in the each interaction information group; and compositing a user attribute feature matrix corresponding to the each interaction information group by user attribute feature vectors, a number of the user attribute feature vectors being identical with the number of categories in the each interaction information group.

9. The method according to claim 8, wherein the preset operation probability generation model corresponds to the category group; and determining, based on the user interaction feature and the pre-trained preset operation probability generation model, the probability of the user performing the target operation associated with the target brand of the target interaction object in the corresponding user interaction information, comprises:

inputting the composited new interaction operation feature matrix into the long short-term memory network in a corresponding preset operation probability generation model according to a category group corresponding to the new interaction operation feature matrix, to generate a new first implicit feature;

inputting the composited user attribute feature matrix into the first fully-connected network in the corresponding preset operation probability generation model, to generate a new second implicit feature;

inputting the generated category feature vector and brand feature vector into the second fully-connected network in the corresponding preset operation probability generation model, to generate a third implicit feature; and inputting the generated new first implicit feature, the new second implicit feature, and the third implicit feature into the third fully-connected network in the corresponding preset operation probability generation model, to generate the probability, corresponding to the input user interaction feature, of the user performing the target operation associated with the target brand of the target interaction object in the user interaction information.

10. The method according to claim 1, wherein the user interaction information further comprises a display position of the interaction object, and the user interaction feature comprises an interaction operation feature matrix, a user attribute feature vector, a category feature vector, and a brand feature vector; and generating, based on the set of user interaction information, the corresponding user interaction feature comprises:

generating, based on the user interaction information, a corresponding initial user interaction operation feature matrix, wherein an element in the initial interaction operation feature matrix is used to represent an interaction operation feature corresponding to the brand of the interaction object, and a row number and a column number of the element in the initial interaction operation feature matrix are used to identify an operation time of the interaction operation corresponding to the brand of the interaction object and the display position of the interaction object respectively;

converting the initial user interaction operation feature matrix into a corresponding two-dimensional matrix, and using the two-dimensional matrix as a corresponding user interaction operation feature matrix;

acquiring the user attribute feature vector generated based on the user attribute information in the user interaction information; and acquiring the category feature vector generated based on information associated with a category of the interaction object in the user interaction information and the brand feature vector generated based on information associated with the brand of the interaction object in the user interaction information.

11. An apparatus for processing user interaction information, comprising:

at least one processor; and a memory storing instructions, wherein the instructions when executed by the at least one processor, cause the at least one processor to perform operations, the operations comprising:

acquiring a set of user interaction information associated with a preset interaction operation, wherein the user interaction information comprises: category information and brand information of an interaction object, user attribute information, and operation time information of an interaction operation corresponding to a brand of the interaction object;

generating, based on the set of user interaction information, a corresponding user interaction feature;

determining, based on the user interaction feature and a pre-trained preset operation probability generation model, probabilities of users performing a target operation associated with a target brand of a target interaction object in corresponding user interaction information, wherein the target operation comprises purchasing a commodity of the target brand;

determining probabilities greater than a preset threshold from the probabilities of the users performing the target operation associated with the target brand, and determining a number of the probabilities greater than the preset threshold;

generating inventory adjustment information according to the number of the probabilities greater than the preset threshold; and controlling a target device to distribute commodities in a logistics warehouse based on the inventory adjustment information.

12. The apparatus according to claim 11, wherein the pre-trained preset operation probability generation model comprises a long short-term memory network, a first fully-connected network, a second fully-connected network, and a third fully-connected network.

13. The apparatus according to claim 12, wherein the user interaction information further comprises a display position of the interaction object, and the user interaction feature comprises an interaction operation feature matrix, a user attribute feature vector, a category feature vector, and a brand feature vector; and generating, based on the set of user interaction information, the corresponding user interaction feature comprises:

generating, based on the user interaction information, a corresponding initial user interaction operation feature matrix, wherein an element in the initial interaction operation feature matrix is used to represent an interaction operation feature corresponding to the brand of the interaction object, and a row number and a column number of the element in the initial interaction operation feature matrix are used to identify an operation time of the interaction operation corresponding to the brand of the interaction object and the display position of the interaction object respectively;

converting the initial user interaction operation feature matrix into a corresponding two-dimensional matrix, and using the two-dimensional matrix as a corresponding user interaction operation feature matrix;

acquiring the user attribute feature vector generated based on the user attribute information in the user interaction information; and acquiring the category feature vector generated based on information associated with a category of the interaction object in the user interaction information and the brand feature vector generated based on information associated with the brand of the interaction object in the user interaction information.

14. The apparatus according to claim 13, wherein the pre-trained preset operation probability generation model comprises at least one preset operation probability generation sub-model corresponding to the category; and determining, based on the user interaction feature and the pre-trained preset operation probability generation model, the probability of the user performing the target operation associated with the target brand of target the interaction object in the corresponding user interaction information comprises:

inputting the user interaction feature generated according to the set of user interaction information into the preset operation probability generation sub-model matched with the category of the interaction object corresponding to the input interaction feature, to generate the probability, corresponding to the input interaction feature, of the user performing the target operation associated with the target brand of the target interaction object in the user interaction information.

15. The apparatus according to claim 14, wherein inputting the user interaction feature generated according to the set of user interaction information into the preset operation probability generation sub-model matched with the category of the interaction object corresponding to the input interaction feature, to generate the probability, corresponding to the input interaction feature, of the user performing the target operation associated with the target brand of the target interaction object in the user interaction information comprises:

inputting the user interaction operation feature matrix generated according to the set of user interaction information into the long short-term memory network in the preset operation probability generation sub-model matched with the category corresponding to the input user interaction feature, to generate a corresponding first implicit feature;

inputting the user attribute feature vector generated according to the set of user interaction information into the first fully-connected network in the preset operation probability generation sub-model matched with the category corresponding to the input user interaction feature, to generate a corresponding second implicit feature;

inputting the category feature vector and the brand feature vector generated according to the set of user interaction information into the second fully-connected network in the preset operation probability generation sub-model matched with the category corresponding to the input user interaction feature, to generate a corresponding third implicit feature; and inputting the generated first implicit feature, the second implicit feature, and the third implicit feature into the third fully-connected network in the preset operation probability generation sub-model matched with the category corresponding to the input user interaction feature, to generate the probability, corresponding to the input user interaction feature, of the user performing the target operation associated with the target brand of the target interaction object in the user interaction information.

16. The apparatus according to claim 15, wherein the preset operation probability generation sub-model is generated by training through following steps of:

acquiring a set of training samples, wherein a training sample comprises sample user interaction information and sample labeling information corresponding to the sample user interaction information, the sample user interaction information comprises sample category information and sample brand information of a sample interaction object, sample user attribute information and sample operation time information of a sample interaction operation corresponding to a sample brand of the sample interaction object, the sample labeling information is used to represent whether a sample user performs a sample target operation associated with a target sample brand of a target sample interaction object in corresponding sample user interaction information, and a category in each piece of sample user interaction information in the set of training samples is consistent;

generating, based on the sample user interaction information in the set of training samples, a corresponding sample user interaction feature; and using the generated sample user interaction feature as an input, and using sample labeling information corresponding to the input sample interaction feature as an expected output, for training to obtain the preset operation probability generation sub-model corresponding to the category of the interaction object in the sample user interaction information.

17. The apparatus according to claim 11, wherein the user interaction information is acquired by:

extracting, in response to determining that the user interaction information does not comprise a user identification, a terminal device identification from the user interaction information; and acquiring at least one candidate user identification associated with the terminal device identification, and associating the user interaction information with the at least one candidate user identification.

18. The apparatus according to claim 13, wherein generating, based on the set of user interaction information, the corresponding user interaction feature, further comprises:

dividing the user interaction information in the set of user interaction information into at least one interaction information group according to a category group to which categories indicated by category information of interaction objects in the user interaction information belong, wherein the category group is obtained by dividing based on a correlation among the categories indicated by the category information;

determining a number of categories of the interaction objects in each interaction information group according to the user interaction information in the interaction information group;

compositing a new user interaction operation feature matrix corresponding to each interaction information group by user interaction operation feature matrices, a number of which is identical with the number of categories in the each interaction information group; and compositing a user attribute feature matrix corresponding to the each interaction information group by user attribute feature vectors, a number of which is identical with the number of categories in the each interaction information group.

19. The apparatus according to claim 18, wherein the preset operation probability generation model corresponds to the category group; and determining, based on the user interaction feature and the pre-trained preset operation probability generation model, the probability of the user performing a target operation associated with a target brand of a target interaction object in corresponding user interaction information comprises:

inputting the composited new interaction operation feature matrix into the long short-term memory network in a corresponding preset operation probability generation model according to a category group corresponding to the new interaction operation feature matrix, to generate a new first implicit feature;

inputting the composited user attribute feature matrix into the first fully-connected network in the corresponding preset operation probability generation model, to generate a new second implicit feature;

inputting the generated category feature vector and brand feature vector into the second fully-connected network in the corresponding preset operation probability generation model, to generate a third implicit feature; and inputting the generated new first implicit feature, the new second implicit feature, and the third implicit feature into the third fully-connected network in the corresponding preset operation probability generation model, to generate the probability, corresponding to the input user interaction feature, of the user performing the target operation associated with the target brand of the target interaction object in the user interaction information.

20. A non-transitory computer-readable medium storing a computer program thereon, wherein the program, when executed by a processor, causes the processor to perform operations comprising:

acquiring a set of user interaction information associated with a preset interaction operation, wherein the user interaction information comprises: category information and brand information of an interaction object, user attribute information, and operation time information of an interaction operation corresponding to a brand of the interaction object;

generating, based on the set of user interaction information, a corresponding user interaction feature;

determining, based on the user interaction feature and a pre-trained preset operation probability generation model, probabilities of users performing a target operation associated with a target brand of a target interaction object in corresponding user interaction information, wherein the target operation comprises purchasing a commodity of the target brand;

determining probabilities greater than a preset threshold from the probabilities of the users performing the target operation associated with the target brand, and determining a number of the probabilities greater than the preset threshold;

generating inventory adjustment information according to the number of the probabilities greater than the preset threshold; and controlling a target device to distribute commodities in a logistics warehouse based on the inventory adjustment information.

* * * * *